United States Patent [19]
Greenberg et al.

[11] Patent Number: 4,954,265
[45] Date of Patent: Sep. 4, 1990

[54] METHOD OF PROCESSING SPENT ELECTROLESS BATH AND BATH FOR USE THEREIN

[75] Inventors: Bernard Greenberg, Brooklyn; Andrew Sulner, New York, both of N.Y.

[73] Assignee: Environmental Recovery Systems, Inc., New York, N.Y.

[21] Appl. No.: 305,246

[22] Filed: Feb. 1, 1989

[51] Int. Cl.$^5$ .......................... B01D 21/01; C02F 1/54
[52] U.S. Cl. .................................... 210/710; 210/725; 210/727; 210/729; 210/737; 210/912; 75/429; 75/430; 423/43; 423/140
[58] Field of Search ............... 210/724, 725, 710, 912, 210/727, 729, 737; 423/42, 43, 140; 75/117, 119

[56] References Cited

U.S. PATENT DOCUMENTS

| | | | |
|---|---|---|---|
| 2,380,731 | 7/1945 | Drake et al. | 252/239 |
| 2,645,635 | 7/1953 | Walton | 210/729 |
| 3,840,469 | 10/1974 | Hobbs, Jr. et al. | 252/413 |
| 3,998,878 | 12/1976 | Hearon et al. | 260/536 |
| 4,018,876 | 4/1977 | Jordon | 423/421 |
| 4,246,185 | 1/1981 | Wood, Jr. | 260/413 R |
| 4,278,539 | 7/1981 | Santhanam et al. | 210/724 |
| 4,289,708 | 9/1981 | Scott et al. | 260/413 R |
| 4,490,297 | 12/1984 | Feld et al. | 260/429 R |

FOREIGN PATENT DOCUMENTS

| | | | |
|---|---|---|---|
| 57187088 | 11/1982 | Japan | 210/912 |
| 59185770 | 10/1984 | Japan | 423/140 |

OTHER PUBLICATIONS

Concepts and Models of Inorganic Chemistry, 2nd ed., Douglas et al., pp. 273-275, 1965.
Kenner and Busch, *Quantitative Analysis*, Chapter 8, "Theory of Precipitation", (McMillan pub. 1979).
The Occidental Chemical Corp. reprint, "Dealing with Spent Electroless Nickel" and *Products Finishing* article, *Plate-Out Pollution Control* and *Products Finishing* articles *Landban* and *Land-Ban Confrontation*.

Primary Examiner—Peter Hruskoci
Assistant Examiner—Krisanne Shideler
Attorney, Agent, or Firm—Kirkpatrick & Lockhart

[57] ABSTRACT

A method of processing an aqueous feed liquid to precipitate at least one metal (e.g., copper, nickel or a combination thereof) in a form to make the metal subsequently removable from the feed liquid by filtration, comprises the initial step of mixing (i) an aqueous feed liquid containing a soluble salt of the metal to be removed, (ii) oxalic acid in excess of that required to react with metal, and (iii) a pH-adjusting liquid in a quantity sufficient to lower the pH of the feed liquid to a point between that at which the feed liquid becomes slightly supersaturated with respect to the oxalate of the metal and that at which precipitation of the metal oxalate is initiated. The mixture is then allowed to stand (either at room temperature or heated to elevated temperatures) for a period of time sufficient to form metal oxalate, and finally the formed metal oxalate is separated from the feed liquid to leave an aqueous liquid suitable for discharge to a sewer line.

33 Claims, 2 Drawing Sheets

METHOD OF PROCESSING SPENT ELECTROLESS BATH AND BATH FOR USE THEREIN

BACKGROUND OF THE INVENTION

1. Field of the Invention

The present invention relates to a method for removing particular metals from a feed stream, and more particularly for removing nickel and copper from a spent electroless deposition bath.

2. Description of the Prior Art

For a variety of technological reasons, electroless deposition of nickel and copper have come into widespread usage. These electroless baths, unlike more common electroplating baths, do not have a continuing life and are depleted as "spent baths" after a short period of time. Typically, after a very limited number of plating cycles (e.g., 5 to 10) the plating rate of an electroless bath will slow sufficiently to become marginal, and the bath has to be discarded as spent. A large percentage (e.g., about 50% of the nickel content) of the original formulation remains in the spent bath. For example, a nickel content of 10,000 ppm may be present in the spent electroless bath, a relatively high concentration as compared to, for example, the typical 1,000 ppm found in a spent rinse used to remove nickel plating solution from plated parts.

Since April, 1984, restrictions on the discharge of seven metals, including nickel and copper, have come into effect in the United States and the "dumping" of the spent baths is prohibited by law. In order to comply with the 1984 regulations, many users of electroless baths simply dosed their wastes with caustic soda to precipitate the metals as hydrous oxides, whereupon the hydrous oxides were filtered off, drummed, and sent off to landfills. Precipitation as a hydrous oxide is a technique which precipitates all but the alkali metals, but in a form which is highly unmanageable. A major chemical problem associated with such treatment develops from the presence of chelating agents in many electroless baths (such as citrates, lactates, glycine or EDTA), which elevate metal levels well above discharge limits at typical alkaline pH's. The addition of flocculants to spent baths to assist in the settling of the hydrous oxides often makes this mass "gummy" and difficult to manage. A major economic problem associated with such treatment is the need for a user to spend thousands of dollars in order to bury even more thousands of dollars worth of metal in landfills, only to achieve the dubious distinction of assuming perpetual liability for that portion of the landfill so occupied. However, as a result of the August, 1988 "landban" regulations of the Environmental Protection Agency (EPA) prohibiting the placement of metallic hydroxides (hydrous oxides) into landfills in the United States, even if alkaline precipitation methods were capable of being perfected, the disposal of the product in landfills is now precluded as a matter of law.

Notwithstanding the above problems associated with the removal of metals from a spent electroless bath as metallic hydroxides, the technique of precipitation to remove metallic compounds from a spent electroless bath remains sound. Precipitation followed by filtration is a preferred technique for metal removal, far less costly than the newer techniques of liquid-liquid extraction or ion exchange. When properly practiced, the technique of precipitation can yield the purest of crystalline products. The formation of crystals of a substance by precipitation from homogeneous solution is an exclusionary process; in order to exclude foreign matter from the product, it is usually only necessary to ensure that the precipitate is crystalline rather than amorphous.

Precipitation from homogeneous solution comprises a category of separation techniques which eliminates the problem caused by the mixing of the solution containing the material to be precipitated with the precipitating agent. (Upon adding the precipitating agent to the feed stream, a "zone of chaos" is temporarily created where the precipitate is poorly formed and often occludes all sorts of impurities.) Use of a precipitating agent which produces a metastable precipitation zone enables the formation of the precipitate to be delayed until the precipitating solution and the solution of the material to be precipitated become homogenous, so that the resultant formation of solids is orderly and exclusionary.

Homogeneous precipitation, as a practicable process, is usually achieved in one of two ways. In the first of these two ways, the precipitating agent is generated in situ by a chemical reaction—that is, the precipitating agent appears gradually from a precursor by a chemical reaction. For example, precipitation of barium sulfate by the addition of a sulfate ester to a barium solution can be effected in this manner. The purity and crystal size of barium sulfate so generated are greatly enhanced. In the second of these two ways, a chemical system is selected to have certain metastable solubility characteristics—that is, the difference in the value of the supersaturation and saturation limits at a given temperature for a given substance (that is, the so-called "metastable" region, a region where precipitation will eventually take place but only with the passage of time) is selected so that the period of time during which the metastable condition exists is considerable so that precipitation is from a homogeneous solution. See Santhanam et al., U.S. Pat. No. 4,278,539 for an example of such a system. Systems where the metastable region are large are usually characterized by having orientational requirements for crystal formation, whereas those systems where the metastable regions are small lack these orientational requirements. The hydrous oxides which are conventionally generated to remove metals from solution have little or no metastable regions and so precipitation is rapid and chaotic, and the precipitate is impure and difficult-to-harvest.

The chemistry of the metal oxalates has received much attention historically in analytic and inorganic chemistry, e.g., the classical method of separation of the lanthanides (rare earth elements) is based on the fractional crystallization of the double oxalates, and the classical simultaneous determination of calcium and magnesium by gravimetric means is as oxalates. Oxalates of such widely divergent metals as Tl, Pb, Ca, Be, Al, Cr, Ti, V, and Mn are well known. It has been reported that all nonalkali metals excepting beryllium form insoluble oxalates. Jordan, U.S. Pat. No. 4,018,876 relates to oxalate precipitation in alkaline media.

The analytical chemical approach to the precipitation of metal oxalates is to treat it as simple insoluble salt formation following the stoichiometric relationship:

$$mM^{n+} + nA^{m-} = M_m A_n \qquad \text{[Equation 1]}$$

For oxalate precipitation, the following equation applies:

$$2mM^{n+} + C_2O_4{}^{2-} = M_2(C_2O_4)N \quad \text{[Equation 2]}$$

For example, with calcium oxalate, the Equation 2 would be:

$$Ca^{2+} + C_2O_4{}^{2-} = CaC_2O_4 \quad \text{[Equation 3]}$$

The solubility product equation for Equation 3 is:
$$[Ca^{2+}][C_2O_4{}^{2-}] = K_{sp} = 2.3 \times 10^{-9} \quad \text{[Equation 4]}$$

The effect of pH on the equilibrium ionization of oxalic acid is that the addition of acid will suppress the concentration of free oxalate ion and therefore increase the solubility of the metal. Learned treatises and scientific literature in this area specifically indicate that all the insoluble metal oxalates are soluble in mineral acid, owing to the removal of free oxalate ion. For example, it has been reported that "all oxalates are soluble in mineral acid." Treadwell and Hall, Analytical Chemistry, Vol. 1, p. 383 (6th Ed., John Wiley & Sons). Cadmium and lead, both of which have oxalates that are more insoluble than those of nickel and copper, apparently do not form insoluble oxalates under conditions of hyperacidity (The oxalate $pK_{sp}$'s are Ni 7.0; Cu 7.5; Cd 7.8; and Pb 11.1). Insoluble calcium oxalate has been shown to resolubilize in acid solution as well. See Hearon et al., U.S. Pat. No. 3,998,878.

In Feld et al., U.S. Pat. No. 4,490,297, cobalt oxalate is said to be sparingly soluble in hydrobromic acid. The presumption is that acid will dissolve some cobalt oxalate. Wood, Jr., U.S. Pat. No. 4,246,185 recognizes that copper can be precipitated as an oxalate from a moderately acidic solution. Precipitation from a hyperacidic solution, however, is not contemplated by the teachings of the Wood, Jr. patent. Oxalic acid has heretofore not been considered as suitable for use as a precipitant of the metals to be removed from an acidic solution such as a spent electroless bath.

Accordingly, it is an object of the present invention to provide a method of processing an aqueous feed liquid (such as a spent electroless bath) to precipitate a metal therein in a form suitable for filtration so as to leave the feed liquid suitable for discharge to a sewer line.

Another object is to provide such a method which precipitates the metal in a purified form without the occlusion of impurities.

A further object is to provide such a method which precipitates from the feed liquid any nickel and copper metals dissolved therein.

It is also an object of the present invention to provide such a method which facilitates the separation of the two metals in a feed liquid both from the feed liquid and each other.

It is another object to provide a bath suitable for use in such a method.

SUMMARY OF THE INVENTION

The above and related objects of the present invention are obtained in a method for processing an aqueous feed liquid to precipitate at least one metal in a form to make the metal subsequently removable from the feed liquid by filtration. The process comprises the step of mixing (i) an aqueous feed liquid containing a soluble salt of the metal to be removed wherein the metal is selected from the group consisting of nickel, copper, or a combination thereof, (ii) oxalic acid in excess of that required to react with the metal, and (iii) a pH-adjusting liquid (e.g., a strong acid) in a quantity sufficient to lower the pH of the feed liquid to a point between that at which the feed liquid becomes slightly supersaturated with respect to the oxalate of the metal and that at which precipitation of the metal oxalate is initiated. The mixture is then allowed to stand for a period of time sufficient to form metal oxalate, and the formed metal oxalate is finally separated from the feed liquid to leave an aqueous liquid suitable for discharge to a sewer line. A strong acid, as used herein, means an acid which is completely ionized in solution. Slightly supersaturated, as used herein, means to be in the metastable range, i.e., the range in which the concentrations are above the equilibrium solubility but not above the point at which precipitation would be substantially instantaneous.

In a preferred embodiment the feed liquid is a spent electroless deposition bath containing nickel, copper or a combination thereof. The metal oxalates of these metals upon crystallization form a square planar configuration. The pH-adjusting liquid is an acid, especially a strong sulfuric acid, hydrochloric acid, or a combination thereof. A base may be added to the feed liquid oxalic acid in a quantity sufficient to precipitate the metal oxalate. The oxalic acid is introduced to the feed liquid to raise the pH thereof prior to mixing with the feed liquid oxalic acid in a quantity sufficient to precipitate the metal oxalate. The oxalic acid is introduced to the feed liquid as an aqueous solution, and preferably the oxalic acid and pH-adjusting liquid are mixed together prior to mixing with the feed liquid. Alternatively, the pH-adjusting liquid is added to the feed liquid prior to addition of the oxalic acid in a quantity sufficient to precipitate the oxalate of the metal, or a quantity of oxalic acid in excess of that required to react with the metal is mixed with the feed liquid while the pH of the feed liquid is above that at which the oxalic acid will cause precipitation. In an alternative embodiment of the process, the oxalic acid is added in solid form to a mixture of the feed liquid and the pH adjusting liquid.

The mixture is adjusted to a pH not greater than about 3.0, preferably to a pH of about 1.0–1.5, and initially maintained at a temperature not greater than about 25° C. Where the feed liquid contains chelators which are deactivated by acid, the pH-adjusting liquid is added in a quantity sufficient to deactivate the chelators. Where the metal is copper, the standing mixture is not heated. Where the metal is nickel, the standing mixture is preferably slowly heated to a temperature not greater than about 60° C. to gradually raise the degree of supersaturation while maintaining the same in the metastable condition; thus, unlike under uncontrolled conditions, the growth rate of metal oxalate crystals remains greater than the nucleation rate (that is, the formation of separate crystals) throughout essentially the entire precipitation of the metal oxalate. As a result, the metal oxalate formed is of a particle size distribution which permits it to be filtered. Preferably, the mixture is heated to cause a temperature rise of roughly 1° C. per minute to a temperature of 50–60° C.

The metal oxalate is separated from the feed liquid by filtration to leave an aqueous liquid in which the metal concentration is reduced to below 0.25 ppm. Thereafter, the metal is recovered as a free metal from the separated metal oxalate by roasting of the separated metal oxalate or as a salt by the addition of a strong acid and hydrogen peroxide to the separated metal oxalate.

Where the feed liquid contains both nickel and copper as the metals to be removed and the nickel and copper are to be substantially separated from each other, the mixture is prefiltered shortly after formation to separate the initially formed metal oxalate from the feed liquid prior to the specified later filtration to remove the subsequently formed metal oxalate from the feed liquid. The initially separated metal oxalate is copper oxalate, and the subsequently separated metal oxalate is nickel oxalate.

The novelty of the above described method is essentially a means of precipitating nickel and copper under extraordinary conditions, i.e., as oxalates in strongly acidic to hyperacidic media. Contrary to the conventional view, on acidification the copper and nickel oxalates of the process of the present invention remain quantitatively insoluble. That is, the solubility of the metal oxalates does not exceed about 0.1 mg/liter, thus, the precipitate is suitable for analytic gravimetric procedures. More importantly, however, the metal content is low enough to permit the effluent to be discharged to a sewer line. When employed to treat spent electroless baths to recover the metal values, a pH of 1.0 to 1.5 is chosen for practical considerations since the filtrate from the process must be neutralized before it can be discharged to a sewer line. In the case of spent electroless plating bath treatment, the process is being carried out at the lowest practicable limit of the permitted acid concentrations.

The present invention also encompasses a bath suitable for use in such a method comprising the aqueous feed liquid, the oxalic acid and the pH-adjusting liquid.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawings wherein.

DETAILED DESCRIPTION OF THE PREFERRED EMBODIMENTS

Figure 1:
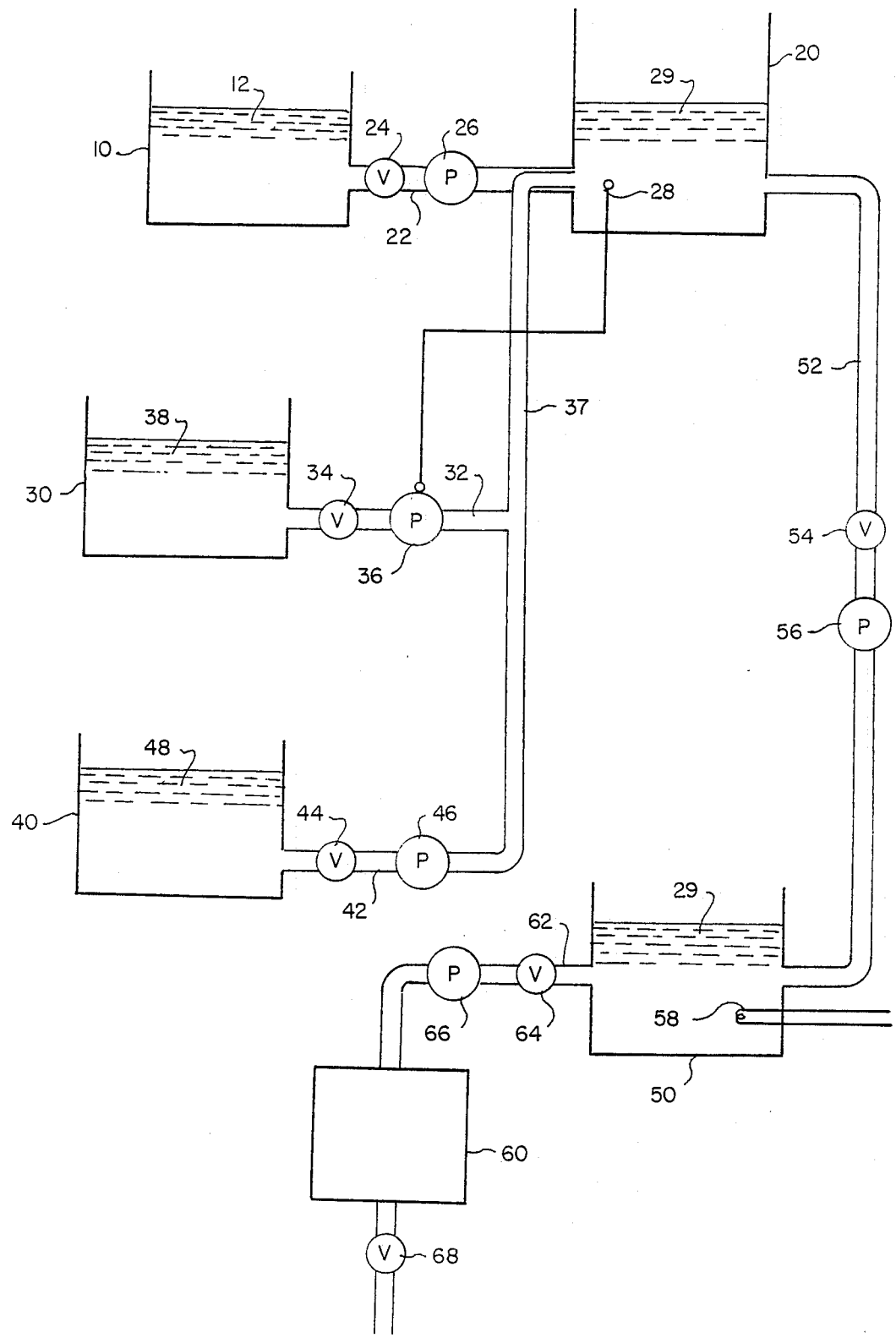
FIG. 1 is a flow chart of the process according to one embodiment of the present invention.

The key to development of a pure and filterable precipitate is the precipitation from a homogeneous solution at a controlled rate. In the present invention a strong acid acts as this key because it creates an activation energy barrier to the reaction which impedes the process of precipitation and thereby provides control of the precipitation rate. Where the precipitation is from spent electroless baths, the strong acid performs the additional function of protonating the chelators found therein and thereby suppresses their ability to keep the metal in soluble form.

The process of the present invention is predicated on the discovery that, notwithstanding the learned treatises and scientific literature in the area, the behavior of nickel and copper oxalates has been incorrectly inferred from the behavior of other metallic oxalates which are appreciably soluble in strong acid. It has been discovered that the solubility of nickel oxalate and copper oxalate in particular, decrease with increasing acid content, contrary to conventional theory which failed to exempt nickel and copper oxalates from the general principle of insoluble salt formation. In fact, both of these oxalates are insoluble in highly concentrated sulfuric acid solutions and can be precipitated in 30% sulfuric acid. By way of comparison, attempts to precipitate cadmium and lead from strong sulfuric acid were ineffective, thus suggesting that there exists an enhanced complex formation mechanism between oxalate and copper or nickel.

In precipitating from solutions of strong acidity (as used herein, pH 0 to about pH 3) to hyperacidity (below pH 0), the chemical process of oxalate salt formation is different than in neutral to alkaline solution where simple negative to positive charge interaction occurs. Under the conditions of precipitation in 30% sulfuric acid, Equation 2 above would apply as follows:

$$M^{2+} + H_2C_2O_4 \rightarrow MC_2O_4(s) + 2H^{30}, \text{ [Equation 5]}$$

where $M = Ni^{2+}$ or $Cu^{2+}$.

While not wishing to be bound by any particular theory, it is suggested herein that the driving force for this process is that the nickel and copper "salts" of oxalic acid are complexed in the solid state in the acidic environment, contrary to conventional theory. Thus, it might be argued that nickel and copper form a special or unique case of oxalate chemistry. Both form square planar configurations which are believed to generate an especially stable complex with the oxalate ion, such stability enabling the complex to form and be insoluble in acids.

Of the metals, only six show oxidation states with square planar coordination geometry. They are divalent Cu, Ni, Pd and Pt, and trivalent Mn and Au. Only divalent oxidation states are considered here because the stoichiometry of the trivalent oxidation state does not allow for a 1:1 ratio between metal and oxalate ion and thus works against a tightly formed insoluble complexed salt. The congeners Ni, Pd and Pt form $d^8$ square planar configurations as their most stable coordination geometries. Copper forms a stable $d^9$ square planar configuration. The copper and nickel square planar configurations develop from ions which are remarkably alike in radius, 0.68 and 0.69 Angstroms respectively. The radius of Pd is 1.38 Angstroms while that of Pt is 0.52 Angstroms. Again, without wishing to be bound by any particular theory, it just might be the case that the stoichiometric, geometric, electronic and dimensional considerations are such that oxalic acid is a specific reagent for the precipitation of copper and nickel from strongly acid solution.

Thus, the process of the present invention is based on precipitating nickel and copper as oxalates in acid solution. The precipitation of nickel and copper can be done simply by adding oxalic acid and adjusting the pH downwardly with a strong acid (e.g., mineral acid such as sulfuric or hydrochloric acid). In case of nickel, the precipitation may be accelerated by warming the mixture to 50-60 degrees Centigrade. Acid precipitation is a requisite in the case of spent electroless nickel and copper bath treatments since the chelators present in the baths are deactivated by the acid. The metal oxalate thus formed can be converted back into free metal by conventional roasting or into a desired salt by conventional hydrogen peroxide treatment.

Since primary metal production often involves the acid leaching of metal bearing ores, the process of the present invention also finds utility in this context, with oxalic acid being used as a precipitant for the nickel or copper in these media. Indeed, where nickel and copper are co-present in the spent acid leach solution, copper oxalate may be separated from nickel oxalate by virtue of their differential rates of precipitation, precipitation of copper oxalate being almost instantaneous and the precipitation of nickel oxide being slower.

At high concentrations of $H^+$ (i.e., at a low pH) there is an activation energy associated with the removal of protons from the oxalic acid, this potential energy barrier increasing in magnitude with increased acidity. In order to overcome this energy barrier and accelerate the reaction, heat is preferably applied. Addition of the oxalic acid to the acid solution of the nickel salt achieves a homogeneous, though metastable, solution from which the rate of precipitation can be controlled precisely through temperature control. With nickel, the rate of precipitation is several hours at room temperatures (e.g., 10–12 hours), and it is accelerated to minutes (e.g., 20 minutes) by merely raising the temperature to about 50° C. With copper, on the other hand, the rate of precipitation is rapid (typically within a minute) even at room temperature, a reflection of the fact that the barrier energy level of copper is considerably lower than that of nickel.

As noted above, precipitation by the present method proceeds slowly in the case of nickel and can be controlled by temperature. The nature of the acid also affects the rate of precipitation. After 20 minutes at 50–60° C. in a hydrochloric acid solution, the nickel concentration is less than 0.25 ppm; after 4 hours at 50–60° C. in a sulfuric acid solution, the nickel concentration is about 0.5 ppm. Sulfuric acid, because of the divalency of sulfate, has a greater tendency to create the formation of nickel containing colloids than the monovalent chloride. Hence it is possible to achieve a true homogeneous precipitation, i.e., one in which ordering of the crystals is obtained, thereby facilitating subsequent filtering and precluding the occlusion of foreign substances within the crystals so that the process is in effect a purification process. Thus purified, the precipitated metal oxalates may be removed by conventional filtration through filter paper, a Gore-tex membrane (available from W.L. Gore & Associates), or the like.

Referring now to FIG. 1, therein illustrated is apparatus useful in the practice of the process of the present invention. The apparatus includes, at the downstream end, a container 10 for the aqueous feed liquid 12. The feed liquid may be a spent electroless bath, an acid leaching solution of the type used to extract metal from ore, or the like. The feed liquid 12 includes at least one metal selected from the group consisting of nickel, copper or a combination thereof which it is desired to precipitate in a form to make the metal subsequently removable from the feed liquid 12 by filtration. Where the feed liquid 12 is a spent electroless bath, it will typically have a pH of about 4–5 for nickel and 10–11 for copper and will include acid-deactivatable chelators, such chelators being useful during the electroless plating operation but presenting a problem with respect to removal of the metals from neutral or alkaline media. In the process of the present invention, flocculants are neither required nor used and thus the problems typically associated with the use of such flocculants to recover metal from feed liquids are totally avoided. Typically the metal concentration in the feed liquid 12 is relatively constant from one spent electroless bath to the next.

In certain instances, the acid content of the feed liquid 12 may be so high—for example, when the feed liquid is an acid leaching solution used for the processing of metal ore -as to render it necessary to add base thereto in a quantity, sufficient to decrease the acidity to a level below which the subsequent introduction of oxalic acid to the feed liquid 12 will cause an uncontrolled precipitation of the metal oxalate which might occlude many impurities.

The container 10 is in fluid communication with a reactor 20 by means of piping 22 including a conventional valve 24 and pump 26. When the normally closed valve 24 is opened and pump 26 is actuated, the spent electroless bath 12 is conveyed from the container 10 to the reactor 20.

The reactor 20 is preferably equipped with an impeller (not shown) or other means for agitating its contents to insure a uniform mixing of the ingredients being introduced thereto. The reactor is provided with a conventional pH probe 28 which produces a signal responsive to the pH of the mixture 29 within the reactor 20.

A pH-adjusting liquid reservoir 30 is in fluid communication with the reactor 20 by means of piping 32, including a conventional valve 34 and pump 36, and piping 37. The reservoir 30 contains a pH-adjusting liquid 38 such as a strong acid. The strong acid is preferably a mineral acid, with sulfuric and hydrochloric acids being especially preferred. While other strong acids may be used, such other strong acids must be competitive with the preferred hydrochloric and sulfuric acids in terms of economic, safety and environmental considerations. For example, trichloracetic acid is sufficiently strong, but is expensive and its discharge environmentally unacceptable. Various strong oxidizing acids, such as nitric or perchloric acid, are unacceptable as they react with oxalic acid to present potentially explosive conditions. Hydrochloric acid may be preferred over sulfuric acid because of the decreased formation of any nickel-containing colloids in a chloride solution relative to a sulfate solution.

The normally closed valve 34 and pump 36 function in response to the pH probe 28 to pump the strong acid 38 from the reservoir 30 to the reactor 20 in a quantity sufficient to lower the pH of the feed liquid 12 within the reactor 20 to a point where the feed liquid 12 is in the desired metastable region, as discussed below in greater detail. The piping 32 may feed the strong acid 38 (the latter optionally containing the oxalic acid as well) directly into the reactor 20, or into the piping 22 adjacent to the inlet to the reactor 20, or, as illustrated, into a smaller concentric pipe 37 within piping 22 so that both fluids 12 and 38 emerge together into reactor 20, preferably adjacent to probe 28. Naturally where the pH of the feed liquid is already in a desired range, as discussed under the case where the feed liquid is a mining leach, no strong acid input will be required. The flow of pH-adjusting liquid is controlled by the pump 36 in response to signals sent by the probe 28 to achieve a pH for the mixture in the reactor 20 which is not greater than about 3.0, and preferably about 1.0–1.5. A suitable pump 36 responsive to pH probe signals is available under the tradename "PHD Prominent" from Prominent Fluid Controls of Frankfurt, West Germany.

Oxalic acid in excess of that required to react with the desired metal in the feed liquid 12 (or metals when a plurality of desired metals are present in the feed liquid 12) is also introduced into the reactor 20. It will be appreciated that generally it is of relatively little consequence whether the oxalic acid is added to the feed liquid before the strong acid or the strong acid is added to the feed liquid before the oxalic acid. Neither, acting on their own, will initiate precipitation of the metal, and in either case precautions should be taken to avoid the creation of localized "hot" zones where uncontrolled precipitation may occur.

To further reduce the possibility of the formation of such "hot" zones, the oxalic acid solution 48 and the strong acid 38 are preferably pre-mixed and the mixture of the two acids then introduced into the reactor 20. For example, as illustrated, the oxalic acid reservoir 40 is in fluid communication with the reactor 20 by means of piping 42, including a conventional valve 44 and pump 46, and piping 37. An aqueous oxalic acid solution 48 within reservoir 40 is pumped into the reactor 20 in quantities appropriate to the metal concentration of the feed liquid 12. Thus, preferably, it is a mixture of the two acids 38, 48 which emerges from piping 37.

The desired stoichiometrically-determined quantity of oxalic acid is present in the reactor mixture 29 as is the probe-determined quantity of the pH-adjusting liquid 38— i.e., the amount of pH-adjusting liquid needed to produce the desired lowering of the pH in the reactor mixture 29. By way of example, ingredients fed into the reactor 20 may include, for each liter of spent electroless bath, 40 grams of oxalic acid dihydrate dissolved in either 50 cc of 98% concentrated sulfuric acid and 50 cc of water or 150 cc of hydrochloric acid (specific gravity 1.19). These ratios are, of course, only exemplary as the required amount of oxalic acid will vary with the metal concentration of the feed liquid 12 and the required amount of strong acid 38 will vary with the initial pH of the feed liquid. The strong acid reservoir 30 may be provided with means (not shown) for agitating the contents thereof to ensure a homogeneous solution of the oxalic acid solution 48 and the strong acid 38.

The oxalic acid 48 in reservoir 40, the pH-adjusting liquid 38 in reservoir 30, and the feed liquid 12 in container 10 are typically at room temperature. Accordingly, the mixture 29 formed in reactor 20 is typically at room temperature. If necessary the reactor 20 may be provided with means (not shown, for maintaining the mixture 29 at a temperature below 25° C. to provide a controlled metal oxalate formation rate and, hence, a pure precipitate.

The reactor 20 is in fluid communication with a holding tank 50 by means of piping 52 including a conventional valve 54 and pump 56. Where the metal to be removed from the mixture 29 fed into the holding tank 50 from the reactor 20 is copper, the holding tank 50 does not require any heating and the dwell time of the mixture 29 within the holding tank 50 need be only on the order of seconds, generally less than one minute, as the formation of copper oxalate occurs rapidly even at room temperature. Of course, in a batch process, the mixture 29 will be retained until it is convenient to further process (i.e., filter) the same. On the other hand, where the metal to be removed is nickel, the required dwell time of the mixture 29 in the holding tank 50 is generally at least 4 hours, and typically about 4–12 hours, if the mixture 29 is not subjected to heating. Alternatively, however, the holding tank 50 may be provided with a thermostatically-controlled heater 58 to heat the mixture 29 within the holding tank 50. The required dwell time of a nickel-containing mixture 29 in the holding tank 50 may be reduced from 4–12 hours to about 20 minutes by suitable heating of the mixture 29.

It is generally not considered desirable to heat a solution from which a material is precipitated because the solubility of the material will generally increase with an increase in the temperature of the solution. In the present instance, however, it is believed that the rate of the postulated complexing of the metal is increased by the increase in temperature of the solution. Apparently the kinetics of the complex formation are such that the positive effects of the increase in temperature (that is, the enhanced complexing rate) dominate over the negative effects (that is, the enhanced solubility of the metal).

Preferably the mixture 29 in holding tank 50 is slowly heated to a temperature not greater than about 60° C. to gradually raise the degree of supersaturation of the metal oxalate in the mixture 29, while maintaining the same in the metastable condition. Under these conditions, the growth rate of metal oxalate crystals remains greater than under uncontrolled conditions vis-a-vis the nucleation rate (that is, the formation of separate crystals) throughout essentially the entire precipitation of the metal oxalate. As a result, the metal oxalate formed is of a particle size distribution which permits it to be filtered. The mixture 29 is slowly heated to cause a temperature rise of preferably 1° C. per minute to a temperature of 50–60° C. with turbidity being noticeable at about 35° C. The enhanced precipitation rate obtained by the use of an elevated temperature is apparently without any sacrifice of the desirable characteristics of filterability or purity of the precipitated metal oxalate. While temperatures up to the normal boiling point of the mixture may be used, there is no particular practical advantage to operating near the boiling point from the point of view of crystal formation, and higher temperatures may cause gas to be expelled from the solution and thereby present occupational hazards.

It will be appreciated that pH is thus a critical factor in the process of the present invention and that temperature control is advantageous for optimizing the process, particularly where the metal to be removed is nickel. Acidity inhibits precipitation, allowing the achievement of the homogeneous solution from which a pure and filterable product may therefore be precipitated. Temperature elevation accelerates the precipitation. A balance between these two factors must, therefore, be achieved.

The holding tank 50 is in fluid communication with a filtration assembly 60 by means of piping 62 including a conventional valve 64 and a pump 66. The mixture 29 from the holding tank 50 is thus passed into the filtration assembly 60 after the holding period, and in particular it is passed through a filtration medium therein such as filter paper, a Gore-tex membrane (available from W.L. Gore & Associates) or the like (not shown). The filtrate is discharged through a valve 68 at the base of the filtration assembly 60 and typically contains less than 0.25 ppm of the metal so that it is suitable for discharge to a sewer line even under the current stringent EPA effluent discharge regulations. The precipitate retained in the filtration medium is then removed for recovery as it is sufficiently pure for such purposes. For example, the nickel or copper thus separated from the feed liquid may be recovered by roasting (e.g., prolonged heating at above 300° C.) the metal oxalate to leave the metal itself. Alternatively, the nickel or copper thus separated may be recovered as a sulfate salt by hydrogen peroxide treatment in which the metal oxalate is dissolved in cold concentrated sulfuric acid and 35% hydrogen peroxide ) is then added in a slow, dropwise manner with stirring until dissolution of the solids is complete. The oxalic acid is thus oxidized to carbon dioxide and water, with the metal sulfate remaining.

A bath according to the present invention includes the aqueous feed liquid 12, the oxalic acid 48, and the pH-adjusting liquid 38.

The following three examples demonstrate the effectiveness of the process of the present invention in rendering the electroless plating solutions safe for disposal.

EXAMPLE 1

Depleted electroless nickel plating solutions which contained six grams per liter (6 g/l) of nickel metal (as chloride), fifty grams per liter (50 g/l) of ammonium chloride and sixty-five grams per liter (65 g/l) of sodium citrate were treated with hydrochloric acid (sp. gr. 1.19) until the pH was 1.20. Oxalic acid dihydrate was added until a slight excess was present (13.0 g) and the bath heated until the temperature was 60 Centigrade (15 minutes). The bath was allowed to cool and the precipitate of nickel oxalate was filtered off. The filtrate remaining contained 0.25 ppm nickel.

EXAMPLE 2

Depleted electroless nickel plating solutions which contained seven grams per liter (7 g/l) of nickel metal (as sulfate), thirty-five grams per liter (35 g/l) of malic acid and ten grams per liter (10 g/l) of succinic acid were treated with sulfuric acid (sp. gr. 1.84) until the pH was 1.0. Oxalic acid dihydrate was added to a slight excess (15.1 g) and the mixture heated until a temperature of 60°. Centigrade was obtained (10 minutes). The bath was allowed to cool and the to precipitate of the nickel oxalate was filtered off. The filtrate remaining contained 0.5 ppm nickel.

EXAMPLE 3

A depleted electroless copper bath containing nine grams per liter (9 g/l) of copper metal with EDTA as complexing agent was adjusted to a pH of 1.15 with hydrochloric acid (sp. gr. 1.19). Oxalic acid dihydrate (20.0 grams) was added with stirring as a solution of 20 g. in 60 c.c. of boiling water. The precipitate of copper oxalate began to form within 15 seconds and was allowed to proceed for 5 minutes whereupon it was filtered off. The filtrate remaining contained 0.25 ppm copper.

As previously noted, the process of the present invention can be applied to primary metal winning of nickel and/or copper from ore leachings. Ore is ordinarily leached with sulfuric acid to solubilize the metals, the leaches typically having a very high acid content of about 200 g/l. As other elements are also leached out of the ore, obtaining pure nickel or copper by conventional precipitation presents a problem. The process of the present invention provides a way to separate the nickel and/or copper from the ore leachings (and even from each other) and operates in acid concentrations as high as 10–30% sulfuric acid. The acid values of the leaching liquor are preserved so that the liquor may be recycled, thus eliminating the need to satisfy EPA effluent discharge regulations.

As the following example demonstrates, the process of the present invention provides an effluent which is substantially free of nickel and copper.

EXAMPLE 4

Sixty-eight grams of oxalic acid dihydrate was added to one liter of an ore leachate containing 291 g/l of sulfuric acid, 16 g/l of nickel and 35 g/l of copper. The precipitate of powder blue copper oxalate formed within one minute and was filtered off. Thirty-five grams of oxalic acid dihydrate was added to the filtrate and the temperature raised to 60° C. The greenish blue nickel oxalate began to form and precipitation was complete in approximately one hour, whereupon the nickel oxalate was removed by filtration. Analysis showed 4 ppm nickel and 1.6 ppm copper were left in solution.

While the rinses from metal electroplating processes could be treated according to the present invention in order to recover the metal values, this application of the present process is not presently considered economical in view of the cost of the oxalic acid expended therein.

Where the feed liquid contains both nickel and copper as the metals to be removed, the nickel and copper may be separated from one another, if desired. To accomplish this, the mixture 29 formed in the reactor 20 is pre-filtered after about a minute in order to separate the initially formed metal oxalate (that is, the copper oxalate) from the feed liquid. Thereafter, the filtrate from the pre-filtering operation is processed in the normal way according to the present invention, with the subsequently formed and separated metal oxalate being the nickel oxalate.

In the case of spent electroless plating baths which are routinely operated at elevated temperatures (77°-87°), a departure from the regime which is dictated by scientific principles is envisioned as follows. This modified technique will yield acceptable effluents and solids of manageable consistency and offers the operator great practical advantages.

Due to the limited solubility of oxalic acid (70 g per liter at room temperature), the formulation of a reagent would require considerable volumes of water to carry the requisite quantity of oxalic acid. This would add about 15% of additional solution volume to the bath. By adding the oxalic acid in solid form, this practical problem could be alleviated.

Since the bath's effectiveness terminates with the completion of its last plating cycle, at which time the bath is still hot, the following procedure can be effectively implemented.

Figure 2:
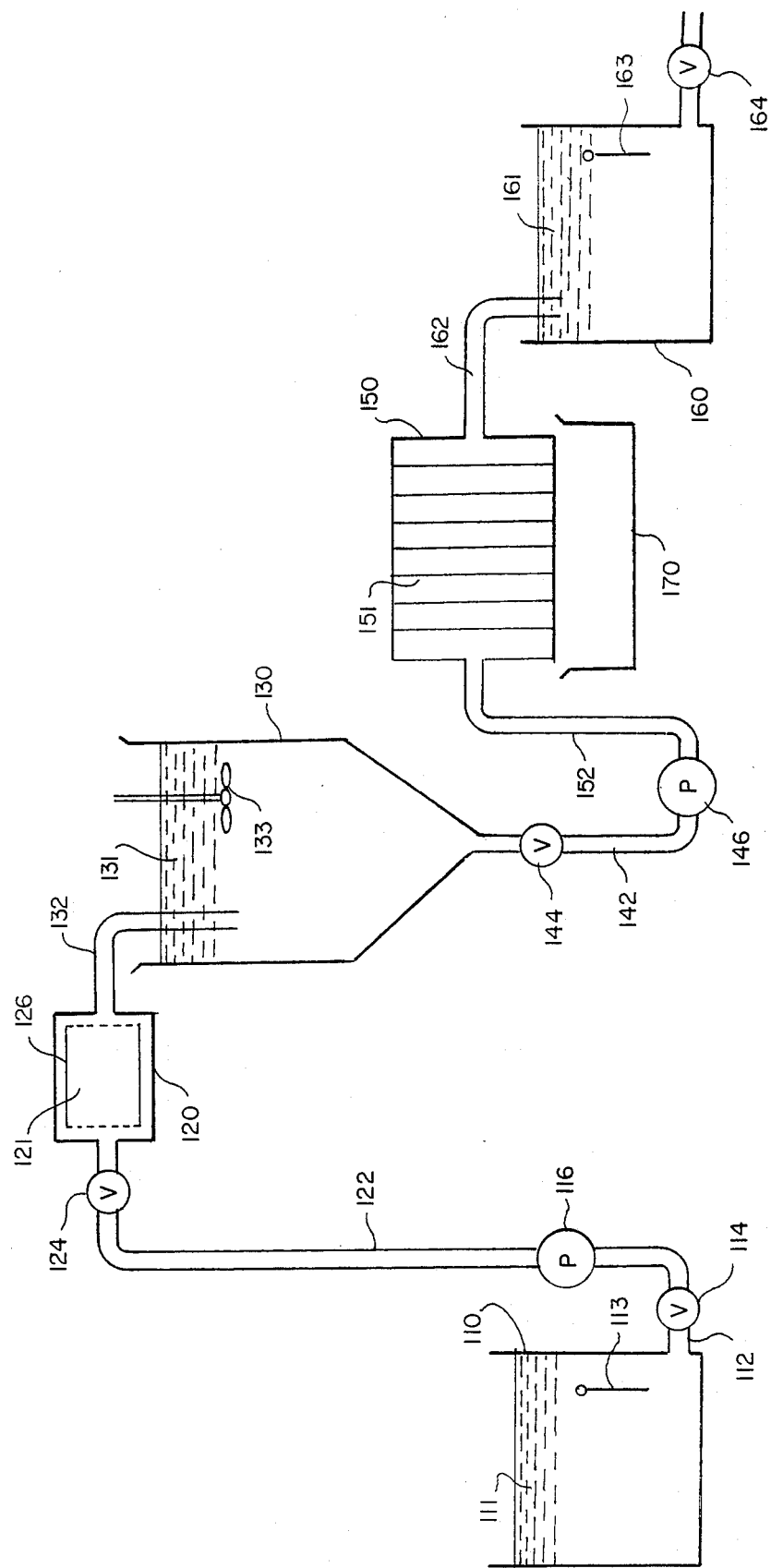
FIG. 2 is a flow chart of the process according to an alternative embodiment of the present invention.

Referring to the drawing in FIG. 2, therein illustrated is apparatus which includes, at the upstream end, a plating tank 110 used in an electroless plating process. The plating tank 110 contains an aqueous feed liquid 111 consisting of a spent electroless bath which includes at least one metal selected from the group consisting of nickel, copper and combinations thereof which it is desired to precipitate in a form to make the metal subsequently removal from the feed liquid 111 by filtration. While still in the plating tank 110 and at operating temperatures (77°-87°), the pH of the feed liquid 111 is adjusted downward with mineral acid until the desired range of 1.01–1.5 is achieved. The plating tank 110 is provided with a conventional pH probe 113 which produces a signal responsive to the pH of the feed liquid 111 within the plating tank 110. The feed liquid 111 is in fluid communication with the holding tank 130 by means of a piping system comprising piping 112 including a conventional valve 114 and centrifugal pump 116, piping 122 including a flow control valve 124 and a cartridge 126 of oxalic acid 121 inserted in a rechargeable chamber 120 incorporated in piping 122, and piping 132. The size of the cartridge 126 is determined by the size of the plating tank 110 and the typical metal levels of the feed liquid bath 111 contained therein. By adjusting the flow control valve 124, the rate of dissolution of the oxalic acid 121 may be adjusted so as to assure achieving the required metastable solubility condition.

The holding tank 130 is preferably equipped with a stirring device 133 which will ensure homogeneous distribution of oxalic acid 121 in the feed liquid 111 as it is being transferred into the holding tank 130.

The treated bath 131 in the holding tank 130 is held therein for approximately 4 to 12 hours until precipitation is complete. This process is referred to as "digestion". Once digestion is completed, a butterfly valve 144 contained in piping 142 opens to allow the treated bath 131 to flow to an air-diaphragm pump 146 contained in piping 142, which pumps the treated bath 131 into a filter press 150 by means of piping 152.

The filter press 150 retains the metal oxalate 151 and discharges the metal-free effluent 161 to a holding tank 160 by means of piping 162. The holding tank 160 is provided with a conventional pH probe 163 which produces a signal responsive to the pH of the metal free effluent 161 within the holding tank 160. The pH of the metal free effluent 161 is adjusted upwards to allow discharge by means of a conventional valve 164 to a sewer line in compliance with applicable effluent discharge regulations.

After a number of cycles of the above procedure, the filter press 150 will have accumulated sufficient metal oxalate solids ("cake") 151 so that the cake 151 will have to be emptied to a containment vessel 170. At this point, the filter press 150 is opened and the recovered metal oxalate cake 151 is dropped into the containment vessel 170 for on-site recovery or shipment to a recovery site.

One disadvantageous aspect of this embodiment of the invention is that it does not allow the operator the means of separating copper oxalate from nickel oxalate by precipitating the copper oxalate at room temperature followed by filtration. However, where copper is not copresent with nickel, this embodiment may be preferred in view of the efficiencies attained.

To summarize, the present invention provides a method of processing an aqueous feed liquid (such as a spent electroless bath) to precipitate nickel and/or copper metal therein in a form suitable for filtration so as to leave the feed liquid suitable for discharge to a sewer line. The metal is precipitated in a purified form without the occlusion of impurities, and the nickel and copper may be separated from one another, if desired. The present invention further provides a bath suitable for use in such method.

Now that the preferred embodiments of the present invention have been shown and described in detail, various modifications and improvements therein will become readily apparent to those skilled in the art. Accordingly, the appended claims should be construed broadly and in a manner consistent with the spirit and scope of the invention herein described.

What we claim is:

1. A method of processing an aqueous feed liquid to precipitate at least one metal in a form to make the metal subsequently removable from the feed liquid by filtration, comprising the steps of:
   (a) adding a base to an aqueous feed liquid containing a soluble salt of the metal to be removed, wherein the metal is selected from the group consisting of nickel, copper and combinations thereof, the base being in a quantity sufficient to precipitate a metal oxalate;
   (b) thereafter, mixing with the feed liquid oxalic acid in excess of that required to react with the metal and a pH-adjusting liquid in a quantity sufficient to lower the pH of the feed liquid to a point between that at which the feed liquid becomes slightly supersaturated with respect to the oxalate of the metal and that at which precipitation of the metal oxalate is initiated;
   (c) allowing the mixture to stand for a period of time sufficient to form metal oxalate; and
   (d) separating the formed metal oxalate from the feed liquid to leave an aqueous liquid in which the metal concentration is less than about four parts per million.

2. The method of claim 1 wherein the metal is copper and in step (c) the mixture is not heated.

3. The method of claim 1 wherein in step (b) the oxalic acid is introduced to the feed liquid as an aqueous solution.

4. The method of claim 1 wherein in step (b) the oxalic acid is introduced in solid form.

5. The method of claim 1 wherein in step (b) the mixture is adjusted to a pH not greater than about 3.0 and maintained at a temperature not greater than about 25° C.

6. The method of claim 1 wherein in step (b) the mixture is adjusted to a pH of about 1.0–1.5 and maintained at a temperature of about 77–87° C.

7. The method of claim 1 wherein the metal is nickel and in step (c) the mixture is slowly heated to a temperature not greater than about 60° C. to gradually raise the degree of supersaturation while maintaining the same in the metastable condition so that the growth rate of metal oxalate crystals remains greater than under uncontrolled conditions vis-a-vis the nucleation rate throughout essentially the entire precipitation of the metal oxalate, and the metal oxalate thereby formed is of a particle size distribution which permits it to be filtered.

8. The method of claim 7 wherein in step (c) the mixture is heated to cause a temperature rise of roughly 1° C. per minute to a temperature of about 50–$\alpha$° C.

9. The method of claim 1 wherein the oxalic acid and the pH-adjusting liquid are mixed with the feed liquid at an operated temperature of about 77–87° C.

10. The method of claim 1 wherein the pH-adjusting liquid is hydrochloric acid and in step (d) the metal oxalate is separated from the feed liquid by filtration to leave an aqueous liquid in which the metal concentration is reduced to 0.25 ppm or below.

11. The method of claim 1 further comprising, following step (d), the step of recovering the metal as a free metal from the separated metal oxalate by roasting the separated metal oxalate.

12. The method of claim 1 further comprising, following step (d), the step of recovering the metal as a salt from the separated metal oxalate by the addition of a strong acid and hydrogen peroxide to the separated metal oxalate.

13. The method of claim 1 wherein the feed liquid contains chelators which can be protonated by acid and the pH-adjusting liquid is present in step (b) in a quantity sufficient to protonate the chelators suppressing their ability to keep the metal in a soluble form.

14. The method of claim 1 wherein the feed liquid contains both nickel and copper as the metals to be removed and further comprising the step of substantially separating the nickel and copper from each other by prefiltering the mixture following step (b) to separate the initially formed metal oxalate from the feed liquid and, in step (d), removing the subsequently formed metal oxalate from the feed liquid following step (c), whereby the initially separated metal oxalate is copper oxalate and the subsequently separated metal oxalate is nickel oxalate.

15. A method of processing an aqueous feed liquid to precipitate at least one metal in a form to make the metal subsequently removable from the feed liquid by filtration, comprising the steps of:
(a) mixing an aqueous feed liquid containing a soluble salt of the metal to be removed, wherein the metal is selected from the group consisting of nickel, copper and combinations thereof with a pH-adjusting liquid in a quantity sufficient to lower the pH of the feed liquid to a point between that at which the feed liquid will become slightly supersaturated with respect to a metal oxalate and that at which precipitation of such a metal oxalate will be initiated, the quantity of pH-adjusting liquid being sufficient to precipitate such a metal oxalate;
(b) adding oxalic acid in excess of that required to react with the metal;
(c) allowing the mixture to stand for a period of time sufficient to form metal oxalate; and
(d) separating the formed metal oxalate from the feed liquid to leave an aqueous liquid in which the metal concentration is less than about four parts per million.

16. The method of claim 15 wherein the pH-adjusting liquid is an acid selected from the group consisting of sulfuric acid, hydrochloric acid and combinations thereof.

17. The method of claim 15 wherein in step (a) the mixture is adjusted to a pH of about 1.0-14 1.5 and maintained at a temperature of about 77-87° C.

18. The method of claim 15 wherein the oxalic acid and the pH-adjusting liquid are mixed with the feed liquid at an operated temperature of about 77-87° C.

19. The method of claim 15 wherein the pH-adjusting liquid is hydrochloric acid and in step (d) the metal oxalate is separated from the feed liquid by filtration to leave an aqueous liquid in which the metal concentration is reduced to 0.25 ppm or below.

20. The method of claim 15 further comprising, following step (d), the steps of recovering the metal as a salt from the separated metal oxalate by the addition of a strong acid and hydrogen peroxide to the separated metal oxalate.

21. The method of claim 15 wherein the feed liquid contains both nickel and copper as the metals to be removed and further comprising the step of substantially separating the nickel and copper from each other by prefiltering the mixture following step (b) to separate the initially formed metal oxalate from the feed liquid and, in step (d), removing the subsequently formed metal oxalate from the feed liquid following step (c), whereby the initially separated metal oxalate is copper oxalate and the subsequently separated metal oxalate is nickel oxalate, 22. A method for processing an aqueous feed liquid to precipitate at least one metal in a form to make the metal subsequently removable from the feed liquid by filtration, comprising the steps of:
(a) premixing oxalic acid in excess of that required to react with a metal in a feed liquid and a pH-adjusting liquid in a quantity sufficient to lower the pH of the feed liquid to a point between that at which the feed liquid becomes supersaturated with respect to the oxalate of the metal and that at which precipitation of the metal oxalate is initiated;
(b) adding to the pre-mixture an aqueous feed liquid containing a soluble salt of the metal to be removed, wherein the metal is selected from the group consisting of nickel, copper and combinations thereof;
(c) allowing the mixture to stand for a period of time sufficient to form metal oxalate; and
(d) separating the formed metal oxalate from the feed liquid to leave an aqueous liquid in which the metal concentration is less than about four parts per million.

23. The method of claim 22 wherein the pH-adjusting liquid is an acid selected from the group consisting of sulfuric acid, hydrochloric acid and combinations thereof.

24. The method of claim 22 wherein in step (a) the mixture is adjusted to a pH of about 1.0-1.5 and maintained at a temperature of about 77-87° C.

25. The method of claim 22 wherein the oxalic acid and the pH-adjusting liquid are mixed with the feed liquid at an operated temperature of about 77-87° C.

26. The method of claim 22 wherein the pH-adjusting liquid is hydrochloric acid and in step (d) the metal oxalate is separated from the feed liquid by filtration to leave an aqueous liquid in which the metal concentration is reduced to 0.25 ppm or below.

27. The method of claim 22 further comprising, following step (d), the step of recovering the metal as a salt from the separated metal oxalate by the addition of a strong acid and hydrogen peroxide to the separated metal oxalate.

28. The method of claim 23 wherein the feed liquid contains both nickel and copper as the metals to be removed and further comprising the step of substantially separating the nickel and copper from each other by prefiltering the mixture following step (b) to separate the initially formed metal oxalate from the feed liquid and, in step (d), removing the subsequently formed metal oxalate from the feed liquid following step (c), whereby the initially separated metal oxalate is copper oxalate and the subsequently separated metal oxalate is nickel oxalate.

29. A method for processing an aqueous feed liquid to precipitate at least one metal in a form to make the metal subsequently removable from the feed liquid by filtration, comprising the steps of:
(a) mixing (i) an aqueous feed liquid containing a soluble salt of the metal to be removed, wherein the metal is selected from the group consisting of nickel, copper and combinations thereof, (ii) oxalic acid in excess of that required to react with the metal, and (iii) a pH-adjusting acid selected from the group consisting of sulfuric acid, hydrochloric acid and combinations thereof, the acid being added in a quantity sufficient to lower the pH of the feed liquid to a point between that at which the feed liquid becomes slightly supersaturated with respect to the oxalate of the metal and that at which precipitation of the metal oxalate is initiated;

(b) allowing the mixture to stand for a period of time sufficient to form metal oxalate; and
(c) separating the formed metal oxalate from the feed liquid to leave an aqueous liquid in which the metal concentration is less than about four parts per million.

30. The method of claim 29 wherein the oxalic acid and the pH-adjusting acid are mixed together prior to mixing with the feed liquid.

31. The method of claim 29 wherein in step (a) the mixture is adjusted to a pH not greater than about 3.0 and maintained at a temperature not greater than about 25° C.

32. The method of claim 29 wherein the pH-adjusting acid is hydrochloric acid and in step (c) the metal oxalate is separated from the feed liquid by filtration to leave an aqueous liquid in which the metal concentration is reduced to 0.25 ppm or below.

33. A method for processing an aqueous feed liquid to precipitate at least one metal in a form to make the metal subsequently removable from the feed liquid by filtration, comprising the steps of:

(a) mixing together at an operated temperature of about 77–87° C. (i) an aqueous feed liquid containing a soluble salt of the metal to be removed, wherein the metal is selected from the group consisting of nickel, copper and combinations thereof, (ii) oxalic acid in excess of that required to react with the metal, and (iii) a pH-adjusting liquid in a quantity sufficient to lower the pH of the feed liquid to a point between that at which the feed liquid becomes a slightly supersaturated with respect to the oxalate of the metal and that at which precipitation of the metal oxalate is initiated;

(b) allowing the mixture to stand for a period of time sufficient to form metal oxalate; and (c) separating the formed metal oxalate from the feed liquid to leave an aqueous liquid in which the metal concentration is less than about four parts per million.

* * * * *